United States Patent
Lindegger

(10) Patent No.: US 7,866,446 B2
(45) Date of Patent: Jan. 11, 2011

(54) METHOD AND DEVICE FOR REDUCING THE ENERGY CONSUMPTION OF AN ELEVATOR INSTALLATION

(75) Inventor: Urs Lindegger, Ebikon (CH)

(73) Assignee: Inventio AG, Hergiswil NW (CH)

( * ) Notice: Subject to any disclaimer, the term of this patent is extended or adjusted under 35 U.S.C. 154(b) by 882 days.

(21) Appl. No.: 11/761,552

(22) Filed: Jun. 12, 2007

(65) Prior Publication Data

US 2007/0295566 A1 Dec. 27, 2007

(30) Foreign Application Priority Data

Jun. 12, 2006 (EP) .................................. 06115311

(51) Int. Cl.
*B66B 1/34* (2006.01)
(52) U.S. Cl. ...................................... 187/393; 187/316
(58) Field of Classification Search ................. 187/281, 187/282, 284, 287, 293, 296, 297, 298, 316, 187/314, 393, 399, 394

See application file for complete search history.

(56) References Cited

U.S. PATENT DOCUMENTS

| | | | | |
|---|---|---|---|---|
| 4,631,467 | A * | 12/1986 | Herrmann et al. | 318/798 |
| 6,049,189 | A * | 4/2000 | Markus et al. | 318/802 |
| 6,283,252 | B1 * | 9/2001 | Lee | 187/291 |
| 6,634,463 | B2 * | 10/2003 | Spannhake et al. | 187/293 |
| 6,782,989 | B2 * | 8/2004 | Spannhake et al. | 198/330 |

FOREIGN PATENT DOCUMENTS

| | | |
|---|---|---|
| JP | 04 327475 A | 11/1992 |
| JP | 2004 083151 A | 3/2004 |
| JP | 2004 244191 A | 9/2004 |
| JP | 2005 212921 A | 8/2005 |
| JP | 2006 036399 A | 2/2006 |

OTHER PUBLICATIONS

Machine Translation for JP 2004-244191 provided by the Patent & Utility Model Gazette DB.*

* cited by examiner

*Primary Examiner*—Walter Benson
*Assistant Examiner*—Eduardo Colon-Santana
(74) *Attorney, Agent, or Firm*—Fraser Clemens Martin & Miller LLC; William J. Clemens

(57) ABSTRACT

A device for reducing the energy consumption is used in an elevator installation which can be alternatively brought into an operating mode and a standby mode wherein in the standby mode the elevator installation is separated from a main energy source and connected with an auxiliary energy source, by means of which basic functions of the elevator installation are maintained so as to enable later entry into the operating mode. The device includes a detecting unit in order to detect a use criterion describing the current use status of the elevator installation. Moreover, a power-saving unit with a microprocessor is provided in order to bring the elevator installation from the operating mode to the standby mode in the case of non-fulfillment of the use criterion and fulfillment of standby criteria and to bring it from the standby mode to the operating mode in the case of non-fulfillment of the standby criteria.

20 Claims, 4 Drawing Sheets

METHOD AND DEVICE FOR REDUCING THE ENERGY CONSUMPTION OF AN ELEVATOR INSTALLATION

FIELD OF THE INVENTION

The invention relates to a method and a device for reducing the energy consumption of an elevator installation having an operating mode and a standby mode.

BACKGROUND OF THE INVENTION

Newer elevator installations can be switched from an operating mode to a standby mode, which is occasionally also termed a sleep mode, if the elevator installation has not been used for a certain period of time.

The energy consumption of an elevator installation is highest when it is in the operating mode and in a working state, i.e. when an elevator car after a request call executes an empty trip to a loading station or a passenger trip.

The energy consumption of the elevator installation is less when the elevator installation is still in the operating mode, but in a pause state. If the elevator installation is in the pause state, then it can be brought to the working state virtually free of delay.

The energy consumption is even less when the elevator installation is in the standby mode and thus to a certain extent sleeps. The elevator installation is then usually separated from its principal energy source, for example domestic mains, and, depending on the respective form of embodiment, connected with an auxiliary energy source, for example the supply of a bus system. In that case the bus system can be realized as a Biobus or LON bus system. In the standby mode substantially only basic functions are maintained in order to guarantee the necessary safety and to create the precondition that the elevator installation can be returned, in a beneficial period of time, from the standby mode to the operating mode. If the elevator installation is to be wakened from the standby mode and brought to the operating mode then it achieves the operating mode usually only after a certain delay time.

A greater part of the energy consumed in total by an elevator installation, namely to over 50%, is apportioned to the time periods in which the elevator installation remains in the standby mode. A reduction in the energy consumption during the operating mode is usually not significant. During the working state it can be realized only to a limited extent, since elevatoring of a load requires a non-reducible amount of energy even when all losses, such as, for example, friction which occurs, are reduced. During the pause state the energy consumption is indeed smaller, but cannot further reduce as desired, because the elevator installation always has to be ready for use without time delay.

The energy consumption of an elevator installation can thus often be perceptibly reduced only when the energy consumption in the standby mode is considerably decreased and, in particular, without the time requirement for re-entry into the operating mode thereby rising to an unacceptable extent. If this time requirement for wakening from the standby mode is kept small then also the operating criteria in which the elevator installation is disposed in the pause state can be appropriately changed and the elevator installation thereby kept longer in the standby mode without user friendliness with respect to waiting times after a request call of the elevator car being substantially impaired.

A safety device is known from patent document JP 04 327 475-A by which, for the purpose of energy saving, there shall be avoidance of interruption of the current feed from a mains to an elevator installation as long as a passenger is in the elevator car. The safety device comprises a lamp which is in operation only when a passenger is in the elevator car. There is concerned in this connection a device which does not allow efficient management of an elevator installation.

SUMMARY OF THE INVENTION

The present invention has the objects of proposing an improved method for reducing energy consumption of an elevator installation, by which a considerable saving of energy can be realized, and creating a device for performance of this method, which device can also be used for retrofitting existing elevator installations.

Basically, the objects of the present invention are achieved by a management which takes into consideration all matters connected with the operation of an elevator installation, particularly user friendliness, safety and conservation of resources. This can be achieved in that firstly the energy consumption is reduced in the standby mode, secondly the time between the beginning of wakening from the standby mode and entry into the operating mode is kept small (i.e., in which the transition time or "wakening time" is short) and thirdly standby criteria are maintained which usefully maximize the total time spent by the elevator installation in the standby mode.

In the minimization of the total energy consumption attention is also directed to the fact that the device proposed for meeting the object of the present invention (termed current-saving means) itself requires only a small amount of energy, so that a considerable part of the achieved saving is not consumed by the means used for the saving.

The current-saving means according to the present invention are preferably so conceived that existing elevator installations can be retrofitted therewith. This additionally contributes to, apart from the reduction in the energy consumption in operation, conservation of resources, because premature total renewal of elevator installations is made redundant.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
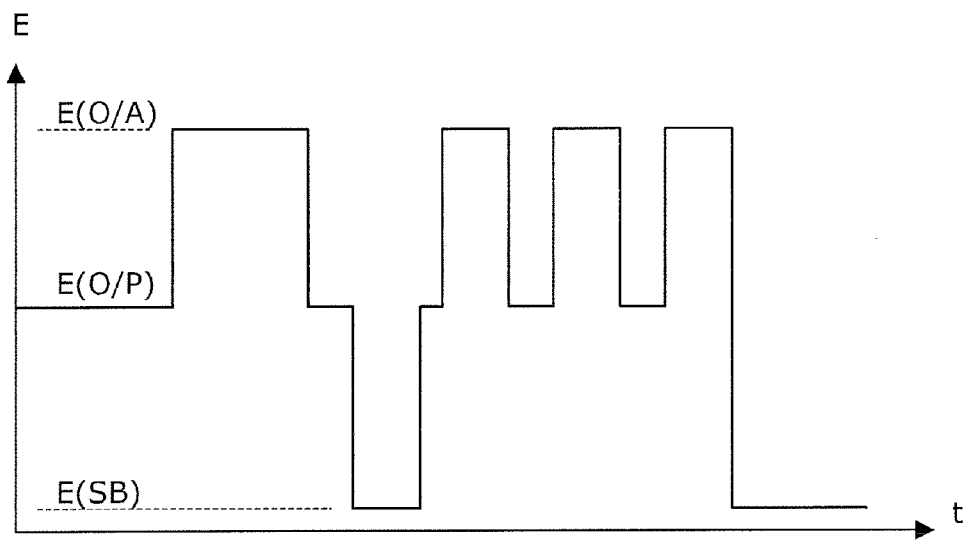
FIG. 1 shows an example of the energy consumption of an elevator installation in dependence on time in simplified graphical illustration.

FIG. 1 shows, in a graphical illustration, an example of the energy consumption of an elevator installation in dependence on time "t". The highest energy consumption E(O/A) occurs when the elevator installation is in the operating mode and thereby in a working state. For simplification, distinction is not made between the energy consumption during transport and that of an empty journey. A lower energy consumption E(O/P) does indeed occur when the elevator installation is in operating mode, but in a pause state. The lowest energy consumption E(SB) occurs when the elevator installation is in the standby mode, also termed the sleep mode. The elevator installation then only still consumes energy from, for example, a special energy source, such as, for example, a battery or a power source of a bus system. This special energy source is here termed an auxiliary energy source and is independent of the main energy source. A generator or the power mains in the building where the elevator installation is located usually serves as the main energy source.

The energy consumption would obviously be even less, namely zero, if the elevator installation were completely stationary and thus also separated from the auxiliary energy source.

Performance of the method according to the present invention is carried out in accordance with a management concept, for realization of which use is made of a microprocessor, i.e. the processes or sequences are microprocessor-controlled. The management concept according to which the desired reduction of the energy consumption is made possible preferably comprises the following possibilities:

The elevator installation is in the operating mode and in the working state when a use criterion is fulfilled, i.e. when a passenger is in the elevator car or a transport is carried out or expected some time soon, particularly when:
  the elevator car executes a transport;
  the elevator car with a passenger is at a station and no travel command is given;
  the elevator car travels empty, after a call-up, to a station, wherein this can take place from the pause state or from the standby mode; and
  the elevator car travels empty without call-up to that station which is the presumed next station to be moved to, wherein this can take place from the pause state or from the standby mode.

The elevator installation is in the operating mode and the pause state when the use criterion is not fulfilled and also standby criteria are not fulfilled, in other words when early use is anticipated, thus particularly when:
  no passenger is in the elevator car;
  no passenger was in the elevator car just before;
  no call-up for travel of the empty elevator car to a station has taken place; and
  a transport or call-up in the near future is expected.

The elevator installation is in the standby mode when the use criterion is not fulfilled and the standby criteria are fulfilled, i.e.:
  when no passenger is in the elevator car;
  no passenger was in the elevator car just before;
  no call-up for travel of the empty elevator car to a station has taken place; and
  no transport or call-up in the near future is expected.

With respect to the use criterion it is to be established that the elevator installation shall in principle not be brought to the standby mode as long as the use criterion is fulfilled, but at least as long as a passenger is in an elevator car and, in particular, independently of whether the standby criteria are fulfilled, i.e. the use criteria always have precedence in the sense of priority relative to the standby criteria.

Standby criteria can be established in various ways in order to bring the elevator installation, appropriately to need, to the standby mode or the operating mode and to keep it there.

For example, with the help of a time switch it is possible to fix time spans in which fundamentally the standby mode or the operating mode shall prevail, depending on the respective time of day or day of the week. For example, it is useful in office buildings, during the time periods of work start and work end, to keep the elevator installation in the operating mode even if, exceptionally, no elevator car is used during a certain time span, because an elevator car will with certainty again be required in the near future. Conversely, it is not useful to keep the elevator installation in the operating mode in the middle of the night even when, exceptionally, an elevator car is used for a single journey, since with very great probability further journeys will be undertaken again only very much later. Standby criteria can, however, also be preset or changed by external means.

An emergency power store with electrical energy is provided, which provides emergency supply of the elevator installation with electric current in the case of failure of the main energy source. As a rule the emergency power store is so designed that the electrical energy is sufficient to transfer the elevator installation to a safe state and to operate car functions, such as a light, an alarm or telecommunications, typically for up to sixty minutes. The emergency power store is usually charged by the main energy source. If an elevator installation is in the standby mode for a longer time and thus to a large extent switched off (separated from the main energy source) then it can happen that emergency power stores totally discharge their emergency power supply and thus suffer a defect. In order to prevent this it is advantageous if the elevator installation can be placed in a charging mode in which partly or entirely discharged emergency power stores are recharged with electrical energy. The elevator installation can be placed in the charging mode, for example, by means of a time switch at specific time intervals or on the basis of monitoring of the state of the emergency power store. This is an optional feature of the power-saving means. The emergency power store can be realized as, for example, an accumulator, a battery or a condenser.

Figure 2:
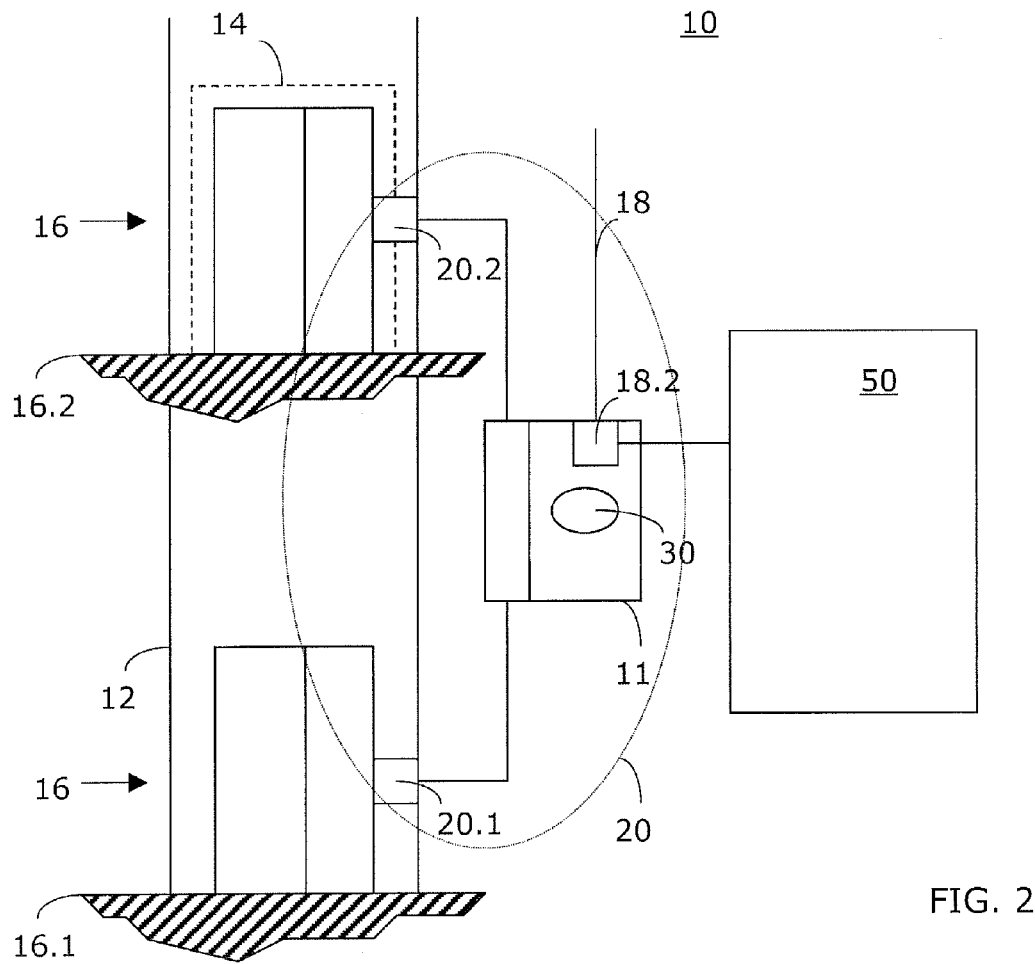
FIG. 2 is a schematic view of an elevator installation with a device according to the present invention.

FIG. 2 shows an example of embodiment of an elevator installation 10 with a device 11 (for example, in the form of a power-saving means) according to the present invention.

The elevator installation 10 shown in FIG. 2 comprises an elevator shaft 12 in which an elevator car 14 can move upwardly and downwardly. Several stations 16 are provided which, in general, lie at the level of floors 16.1, 16.2 of a building in which the elevator installation 10 is located. The elevator shaft 12 has a cabling 18 by way of which the elevator installation 10 is connected with its (main) energy source, which is not illustrated in FIG. 2. This energy source is provided specifically for the elevator installation 10 and supplies substantially the energy consumed by the elevator installation 10 in the operating mode. In addition, FIG. 2 shows a device 20 (also called house installation) for calling the elevator installation 10. This device 20 can be supplied with power by way of an auxiliary energy source (not shown). This auxiliary energy source can be so designed that it substantially supplies the energy, which is consumed by the house installation in standby mode, inclusive of the energy for wakening the elevator installation 10 from the standby mode. That means that request calls can be placed, notwithstanding separation of the elevator installation from the main supply, which have the consequence that the elevator installation is "wakened" by the power-saving means 11.

Small panels 22.1, 22.2 with actuating elements, such as, for example, call buttons or call keys, with the help of which the elevator car 14 can be requested, i.e. ordered or pre-ordered for the corresponding floor, are present at the individual floors 16.1, 16.2. These panels 22.1, 22.2 are part of the house installation 20. At least when the elevator installation 10 is in the standby mode, but mostly in general, the energy supply of the house installation 20 is carried out by the auxiliary energy source. Implemented in the power-saving means 11 by means of a microprocessor 30 is a management concept which undertakes co-ordination of the functions, wherein, in particular, the adherence to various criteria, according to which the operating mode or the standby mode is maintained, is assessed.

Figure 3:
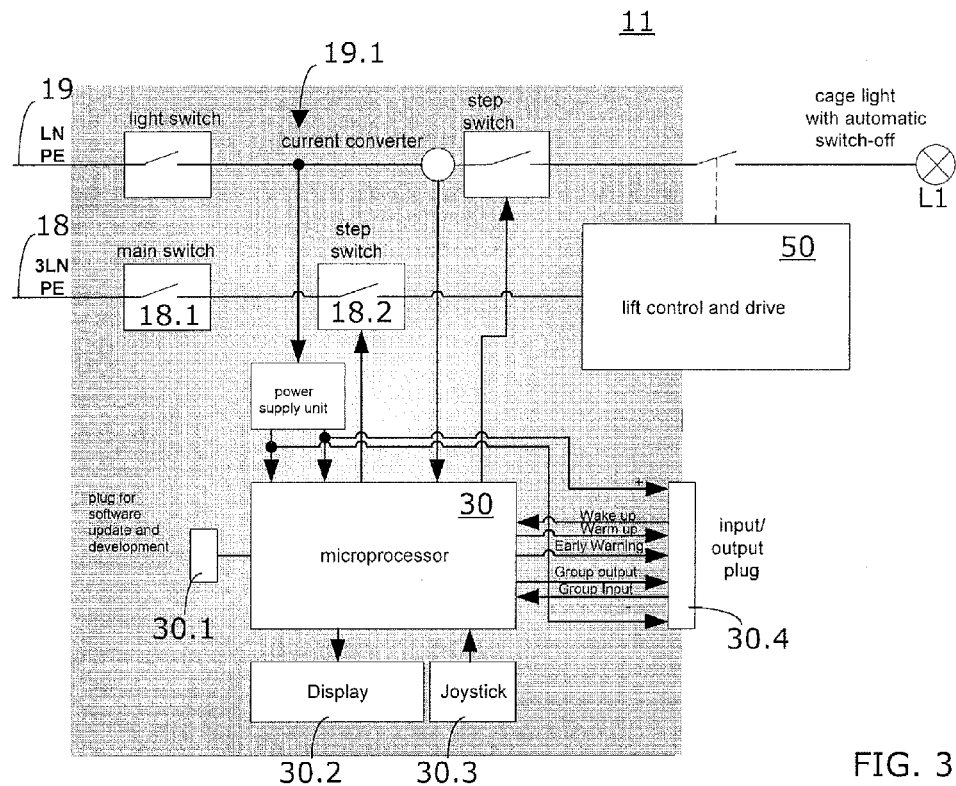
FIG. 3 is a schematic block diagram of an example of the current-saving means for reducing the energy consumption of a elevator installation according to the present invention.

FIG. 3 shows an example of the power-saving means 11 according to the present invention and is substantially self-explanatory. In the illustrated example the power supply for the car lighting is executed separately from the power supply of the elevator control 50 and of the drive (here termed main energy source). The connection with the main energy source takes place by way of a main switch 18.1 and a terminal 18. The power-saving means 11 comprise, as shown, the microprocessor 30 which monitors the most diverse criteria and realizes the management concept.

Before the elevator installation 10 is brought into the standby mode it is necessary, as mentioned, to primarily establish that the use criterion is not fulfilled and secondarily that the standby criteria are fulfilled.

In order to establish whether the use criterion is not fulfilled, it is usually monitored whether or not a car light L1 is switched on. The car light L1 is normally always switched on when a passenger is in the elevator car 14 or has left this only shortly before. The car light L1 can also be switched on when the elevator car 14 starts out, in response to a request call from the station, from this station or generally when the elevator car 14 is in motion.

Monitoring of the car light L1 can take place with the help of a detecting device or sensor device, wherein this, for example, detects or monitors the current feed 19 to the car light L1. The car light L1 can be switched on in various ways, particularly when the weight or heat output of a passenger in the elevator car 14 is sensed.

If an elevator installation 10 without a switchable car light of that kind is to be retrofitted with the energy-saving device according to the present invention then the retrofitting also has to include such a car light system, which usually can be easily carried out. By comparison with permanently lit elevator cars 14 the energy consumption is considerably reduced only by the installation of such a car lighting determined by the use criterion.

The detecting means for detecting the use criterion, more specifically for detecting whether the use criterion is maintained, can also be constructed for the purpose of detecting the brightness in a monitoring zone, particularly in the elevator car 14, and thus establishing the elevator status.

If, as described above, the use criterion is monitored with the help of the car light L1, then this is preferably carried out, as shown in FIG. 3, by means of a current converter 19.1, since the relay of the car light L1 is often arranged at the elevator car 14 and thus not accessible from the power-saving means 11.

In order to bring the elevator installation 10 into the standby mode, a step switch 18.2 is preferably used for the interruption, which is required for that purpose, of the (main) energy supply, since such a switch consumes energy only during the switching process. If instead of the step switch 18.2 use is made of a conventional circuit breaker, then such a breaker consumes in operation several watts (approximately 10 W), thus also during standby.

So that the functionality of the new power-setting means 11 can be adapted in simple manner to certain special needs and expanded or improved with advancing technical development a plug 30.1 or an interface to a software update is, according to FIG. 3, present. This interface is optional.

In addition, a user interface with an output unit, for example with a visualization unit such as a display 30.2, and with an input unit, for example with a mobile joystick 30.3, can be provided. Utilization logs can also be set up and control steps programmed by an optional additional memory unit and a clock.

The device according to FIG. 3 can, in addition, comprise an input/output plug system 30.4. This allows wakening of the elevator installation 10 from the standby mode by way of external means. Simple possibilities for this purpose are a key-operated switch system or another closed system, for example with a card reader, in addition dedicated wakening buttons, sensors for detection of persons desiring use, such as infrared or radar, signal receivers for signals from buildings, or a second switching plane in the control elements, i.e., for example, the call buttons or call touch keys (for example, a Biobus or LOP bus system).

In addition, voltage for the connection of further apparatus can be supplied by way of the plug system 30.4. In particular, an early-warning output can be provided so as to signal that the energy-saving means 11 will soon break off the connection 18 to the power source and the elevator installation 10 will go into the standby mode.

A further output of the plug system 30.4 can be used so as to indicate that the elevator installation 10 disposed in the standby mode was wakened and will soon go into the operating mode, thus is in a warm-up state. Here, for example, it is possible to connect displays or signal lamps, the signals of which inform apparatus or future passengers about the state of the power-saving means 11.

Elevator-specific or product-specific interfaces, with the help of which expanded possibilities especially in connection with special control intentions are opened up, can be connected with the input of the plug system 30.4, since the mounting of additional buttons and switches on the panels 20.1, 20.2 of the floors is often problematic.

Figure 4A:
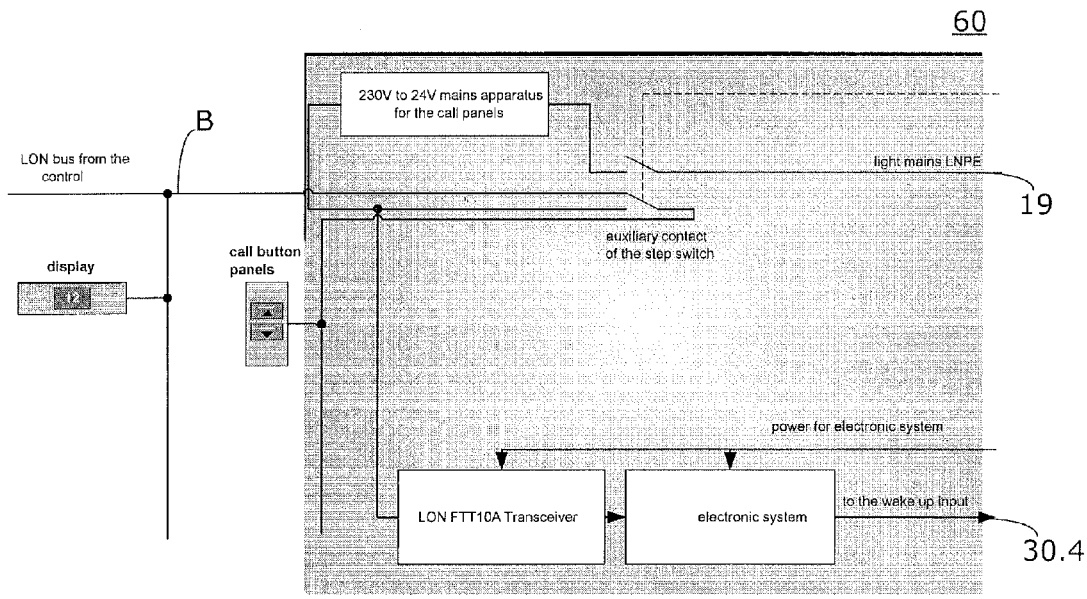
FIG. 4A is a block diagram of a first interface for use with a device according to the present invention.
Figure 4B:
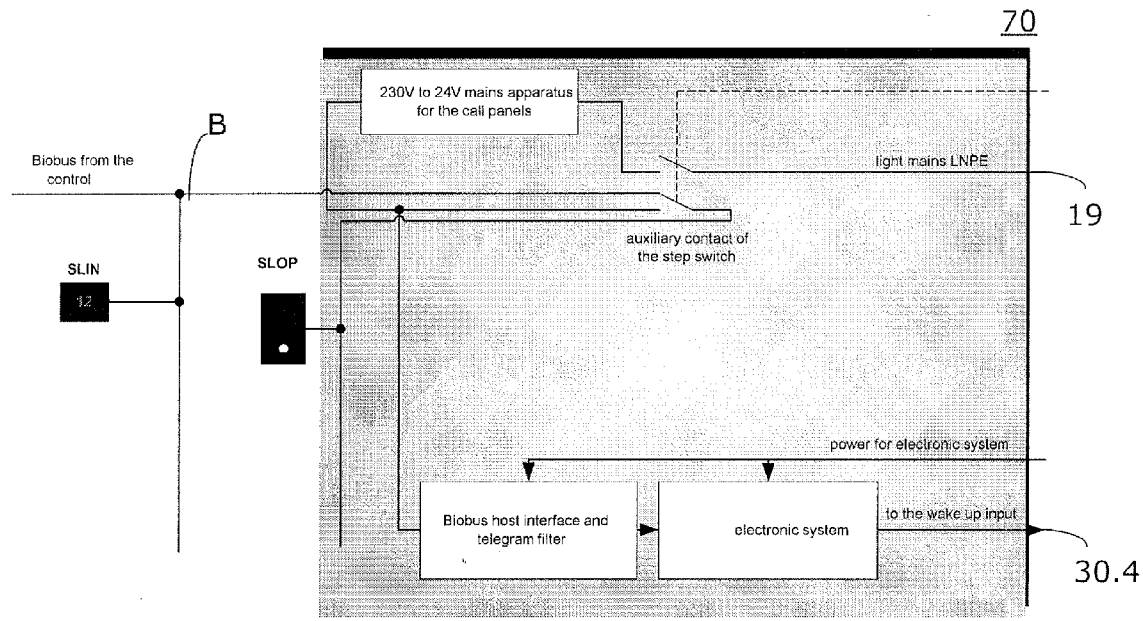
FIG. 4B is block diagram of a second interface for use with a device according to the present invention.

FIG. 4A shows a special LON bus system 60 for producing and communicating signals and FIG. 4B shows another specific bus system 70 (a Schindler Biobus) for the same purpose. These bus systems 60, 70 are used when the elevator installation 10 is in the standby mode. The connection 18 with the main energy source is then interrupted, but the panels 20.1, 20.2 or control buttons or keys on the floors must still be kept capable of action, for example by the auxiliary energy source, and for this purpose supplied with energy, since a passenger desiring use can appear at any time. The panels 20.1, 20.2 are operated by the bus system 60, 70 while the elevator installation 10 is in standby mode or sleeps. If a future passenger actuates a call button for calling or, in other words, requesting the elevator car 14, then a communication on the bus B emanates from the respective panel 20.1, 20.2. This communication is recognized by the interface, whereupon the interface via wake-up input causes the device according to the invention, i.e. the current-saving means 11, to wake up the elevator installation 10 so as to bring it into the operating mode. In order to save energy and/or due to limited power of the power supply part of the interface it may be possibly be necessary to separate, on the floors, the displays from the panels 20.1, 20.2 with the call buttons.

Figure 5:
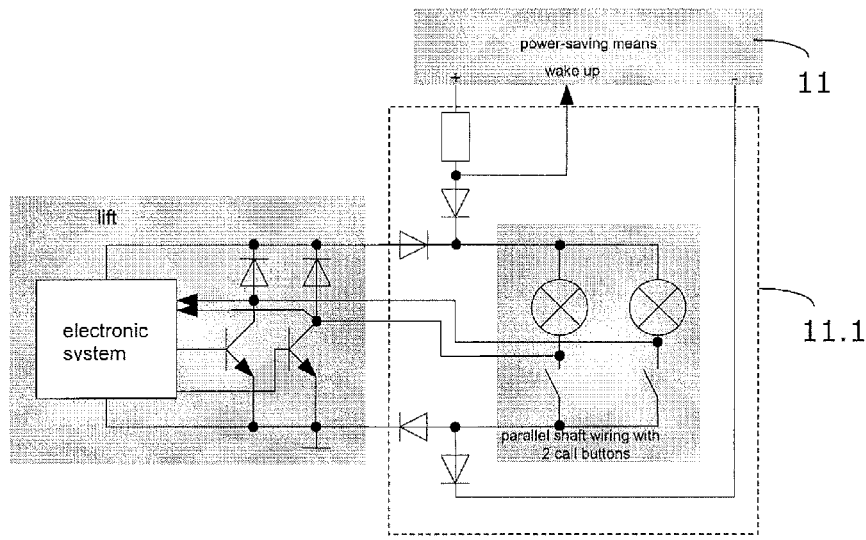
FIG. 5 is a block diagram of an example of a parallel shaft cabling for connection of the current-saving means according to the present invention.

The cabling outside the elevator shaft 12 (termed house installation 20) was explained further above with reference to FIG. 2. FIG. 5 now shows the possibility of connecting the device 11 according to the present invention with a parallel shaft cabling. If a call button is actuated on one of the floors, this then has the consequence of a change in the voltage on a corresponding conductor wire of the house installation 20. If the elevator installation 10 goes over, for example, five floors, then five signals have to be monitored so that at the appropriate moment, namely when an elevator car 14 is requested at one of the five floors, the elevator installation 10 is wakened from the standby mode and placed in the operating mode. In the realization of such a part of an elevator installation 10 the following points should be noted, of which some are particularly relevant when the power-saving means 11 are to be used for retrofitting an existing elevator installation 10:

Firstly, the number of signals to be monitored grows, and thus the conductor wires, with the number of floors or the number of call buttons of the panels. A single signal can indeed be obtained by means of diodes or transistors from the multiplicity of these signals, but in the case of an arrangement of that kind the wiring cost and susceptibility to fault is substantial.

Secondly, the actual elevator installation 10 and the device according to the present invention, i.e. the power-saving means 11, are conductively connected. If the elevator installation 10 is in the standby mode and the connection 18 with the principal energy source is interrupted then a feedback from the current-saving means 11 to the actual elevator installation 10 can take place. This can lead to faulty functionings.

Thirdly, the energy supply for indication of those of the call buttons or call keys which lead to complications in terms of apparatus should be separated. Call buttons or call keys are often connected with displays in the form of acknowledgement lamps integrated therein, so that a separation is not possible.

Fourthly, compensating currents can flow between the earth of the power-saving means 11 on the one hand and the actual elevator system 10 on the other hand. It has to be ensured for this situation that the power-saving means 11 does not have a connection to ground.

The above-mentioned problems can be largely avoided with a (coupling) circuit 11.1 according to FIG. 5.

Previously, only elevator installations 10 containing an individual elevator shaft 12 have been mentioned. However, it is obvious that measures for reduction in the energy consumption are significantly more effective in conjunction with elevator installations 10 comprising several elevator shafts 12 and/or elevator cars 14, as shown by way of example in FIG. 6. Elevator installations 10 with an entire group of elevators are used in, for example, office buildings, department stores, railway stations and airports. In most cases the loading of such groups of elevators is not continuous in terms of time. For example, in office buildings the elevators are heavily used at work start and work end, little used in the between periods and hardly used at night and at weekends. The power-saving means 11 of the individual elevators can be connected in different ways, for example circularly, in star shape or in network.

An arrangement can be selected in which each individual elevator has a power-saving means 11 with an own microprocessor 30, as is described further above, for example, with reference to FIG. 3, wherein individual additional functions for communication with the other power-saving means 11 can be required. Such arrangements, in combination with a multilateral network, are optimum with respect to their functioning, but costly in terms of apparatus.

Alternatively, as already explained, arrangements with other connecting configurations and/or with only a single (for example, central) microprocessor 30 can be selected.

Figure 6:
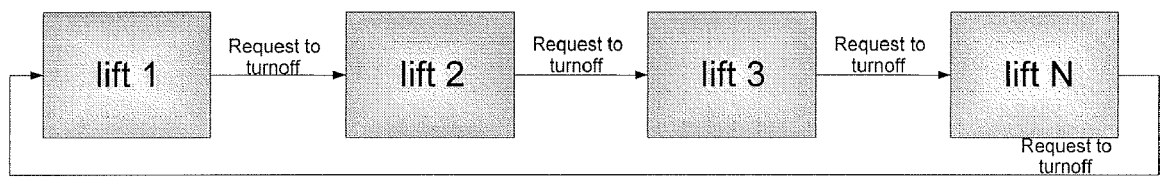
FIG. 6 is a block diagram of an example of a communication of current-saving means of adjacent elevators in an elevator group according to the present invention.

In the case of a circular connection, as is illustrated in FIG. 6, in principal every power-saving means 11 can communicate with the power-saving means 11 of the directly adjacent elevators, wherein the management is ultimately responsible for the modes of the totality of the individual elevators.

If overall there is a low requirement for transport performance, then usually one of the elevators is unused for a longer period of time and remains in the pause state. However, this elevator is then not immediately displaced from the operating mode to the standby mode, but an interrogation of the adjacent elevator or a request to allow displacement to the standby mode takes place. As long as a sufficient number of elevators of the elevator installation 10 remain in the operating mode, the interrogated elevator, which is no longer loaded, is displaced to the standby mode. Which elevator is last displaced to the standby mode can depend on chance or be controlled. If, for example, individual elevators of the elevator installation 10 are different in that they have different sizes or selectively travel to different floors, then it is determined which elevator is last to go to the standby mode, namely, in the absence of other request criteria, a small elevator which travels to all floors. If no elevator of the elevator installation 10 is used for a longer period of time, then the last active elevator is also displaced to the standby mode. If the incidence of traffic later increases again, then initially a single elevator is displaced to the operating mode. If this elevator is then highly loaded, then it withdraws from one of the other elevators the authorization to be in the standby mode and thereby causes this second elevator to go to the operating mode. If then both elevators are too highly loaded, they cause a further elevator to go to the operating mode.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method of reducing energy consumption of an elevator installation which can be alternatively brought into an operating mode and a standby mode, comprising the steps of:
   detecting a use criterion with a detecting means; and
   bringing the elevator installation by a mode changing means from the operating mode to the standby mode in the case of non-fulfillment of the use criterion and fulfillment of a standby criteria and from the standby mode to the operating mode in the case of non-fulfillment of the standby criteria, and when the use criterion and the standby criteria are fulfilled at a same time, operating the elevator installation with precedence for the use criterion.

2. The method according to claim 1 wherein the use criterion is fulfilled at least when a passenger is in an elevator car and the elevator installation thus remains in the operating mode.

3. The method according to claim 2 including monitoring a power feed to a light, which light remains switched on in the case of presence of a passenger in the elevator car, of an elevator car for detecting the use criterion.

4. The method according to claim 1 including fixing at least one standby criterion to determine switch-over times and/or time spans for the standby mode.

5. The method according to claim 4 wherein at least a part of the standby criteria is fixed by a programmable time switch.

6. The method according to claim 4 wherein at least a part of the standby criteria is fixed by an external means.

7. The method according to claim 6 wherein the external means is an interface.

8. The method according to claim 1 including charging an emergency power store in the standby mode.

9. A device for reducing energy consumption of an elevator installation which can be alternatively brought into an operating mode and a standby mode, comprising:

detecting means for detecting a use criterion describing a current use status of the elevator installation; and power-saving means connected with the elevator installation and said detecting means and having a microprocessor for changing the elevator installation from the operating mode to the standby mode in a case of non-fulfillment of the use criterion and fulfillment of a standby criteria describing a current standby status of the elevator installation and from the standby mode to the operating mode in the case of non-fulfillment of the standby criteria, and when the use criterion and the standby criteria are fulfilled at a same time, operating the elevator installation with precedence for the use criterion.

10. The device according to claim 9 wherein said detecting means for detecting fulfillment of the use criterion includes means for detecting a power feed to a lighting body of an elevator car of the elevator installation.

11. The device according to claim 10 wherein said means for detecting is a current converter.

12. The device according to claim 9 wherein said power-saving means includes means for fixing at least a part of the standby criteria.

13. The device according to claim 12 wherein said means for fixing includes a programmable time switch.

14. The device according to claim 9 including external control means connectible by an interface with said power-saving means for fixing at least a part of the standby criteria.

15. The device according to claim 9 wherein said power-saving means includes a step switch for separating at least a part of the elevator installation from a main energy source.

16. The device according to claim 9 wherein said power-saving means is constructed for retrofitting to existing elevator installations.

17. The device according to claim 9 wherein the elevator installation comprises several elevators and said power-saving means is provided per elevator, said power saving means being connected together.

18. The device according to claim 9 wherein the elevator installation has at least one emergency power store which is chargeable in the standby mode of the elevator installation.

19. An elevator installation with a device according claim 9 wherein the elevator installation in the standby mode is separated at least partly from a main energy source and only basic functions of the elevator installation are maintained so as to enable later entry into the operating mode.

20. A method of retrofitting an elevator installation utilizing a device according to claim 9.

* * * * *